United States Patent [19]
Flowers

[11] 3,994,229
[45] Nov. 30, 1976

[54] PULSE DOPPLER PROXIMITY FUZE
[75] Inventor: John W. Flowers, Gainesville, Fla.
[73] Assignee: The United States of America as represented by the Secretary of the Navy, Washington, D.C.
[22] Filed: Sept. 17, 1957
[21] Appl. No.: 684,831

[52] U.S. Cl. ................. 102/70.2 P; 343/7 PF
[51] Int. Cl.² ............... F42C 13/04; F42C 13/00; G01S 9/46
[58] Field of Search ............. 343/7, 13.1, 101.1, 343/6.8, 7 PF; 102/70.2, 70.2 P; 250/13

[56] References Cited
UNITED STATES PATENTS
2,699,543   11/1955   Nauman ..................... 343/7
2,856,852   10/1958   Hinman ..................... 343/7

FOREIGN PATENTS OR APPLICATIONS
38,789   7/1931   France ..................... 102/702

Primary Examiner—Samuel Feinberg
Assistant Examiner—Thomas H. Webb

EXEMPLARY CLAIM

1. An oscillator-detector circuit comprising operating potential energy sources, first self pulsing circuit means intermittently oscillatory for developing high frequency electromagnetic energy pulses of a preselected carrier frequency and repetition rate, electromagnetic energy radiating means electrically coupled to said first circuit for effecting radiation of said developed pulses into space and for receiving any reflected electromagnetic pulses, and a second oscillatory circuit means inductively coupled to said first circuit means and being rendered intermittently oscillatory during the occurrence of said developed pulses for selectively detecting variations in the magnitudes of said developed pulses caused by said reflected pulses and for developing an output signal having a frequency correlative to said variations, said first and second oscillatory circuits being parallel connected across said energy sources.

10 Claims, 4 Drawing Figures

U.S. Patent  Nov. 30, 1976  3,994,229
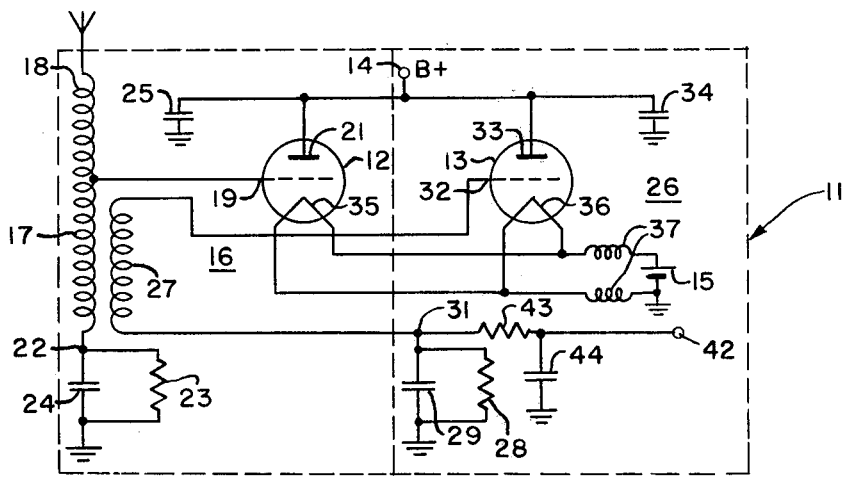
FIG.1.
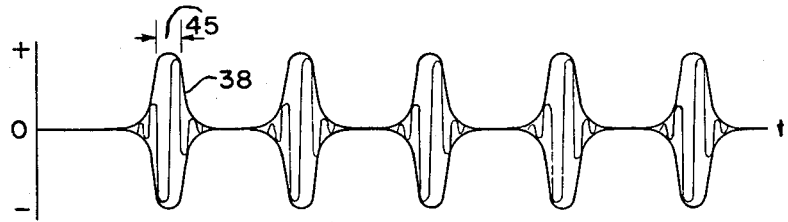
FIG.2a.
FIG.2b.
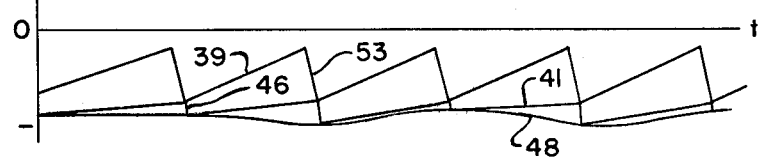
FIG.3.
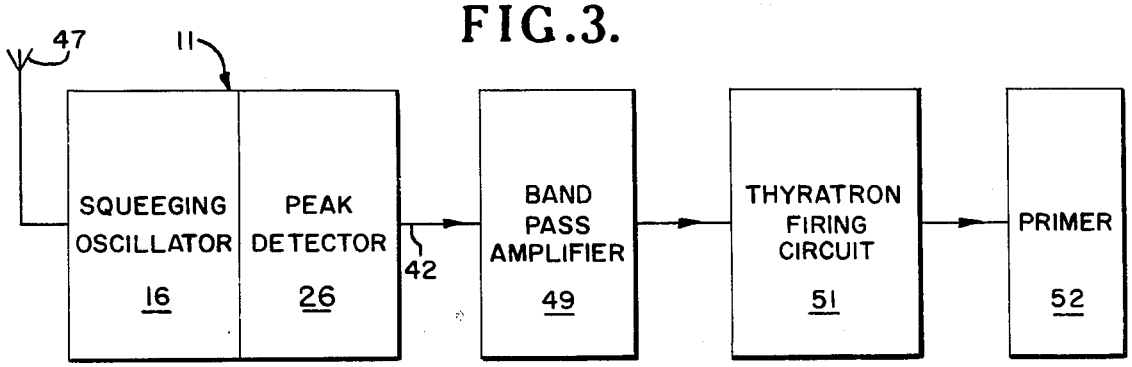
INVENTOR.
JOHN W. FLOWERS
BY
ATTYS.

PULSE DOPPLER PROXIMITY FUZE

This invention relates generally to high frequency oscillating and detecting circuitry, and more particularly to a self-pulsing oscillator and peak detector circuit having noise-free and insensitivity operating characteristics superior to those obtained in present day circuitry of the class to which the instant invention pertains.

Although self-pulsing, or so-called "squeeging", oscillator-detector circuits have been heretofore devised, the majority of the componential oscillator circuits were found to develop relatively large noise signals which resulted in inherent erratic variations of the repetition rate of the impulses generated by the self-quenching oscillators. Additionally, the majority of the present day componential detector circuits have not operated entirely satisfactorily because of their design as averaging superregenerative detectors, which detectors are unduly sensitive to inherent and spurious noise signals, as well as the erratic repetition rate of pulses generated by the squeeging oscillator.

Oscillator-detector systems of the type related to the instant invention are utilized in transceiver systems, particularly those systems which relate to the detection of moving objects or targets, such for example as a pulse-doppler proximity fuze. Although the prior art oscillator-detector circuits have, in the past, been employed in proximity fuzes, their performance leaves much to be desired in such applications. In addition to the limitations of the present day squeeging oscillator-detector circuits hereinbefore described, these present day circuits have also been found to be unduly sensitive to environmental disturbances, such for example as rain drops, water surface waves, cloud formation and the like. Moreover, in many instances the inherently generated noise level has been found to exceed the energy level of the reflected target signal thereby resulting in complete operational failure of the fuzes. Adjunctive circuitry necessary to overcome the hereinbefore described operational limitations and problems have been found to be too complex and bulky for ordnance fuzing applications.

Accordingly, a principal object of the instant invention is to provide a new and improved high frequency oscillator-detector circuit.

Another object of the present invention is the provision of a new and improved self-pulsing oscillator and peak detecting circuit.

A further object of the instant invention is the provision of a novel double-tube squeeging oscillator and peak signal detector system responsive to variations in the peak amplitudes of successively generated radio frequency modulations commonly known as a pulse or impulse.

A still further object of the present invention is to provide a new and improved electromagnetic energy impulse generating and detecting system having operational characteristics substantially insensitive to inherent and spurious noise signals.

Still another object of the instant invention is the provision of a new and improved pulse doppler proximity fuze being less susceptible to environmental disturbances and enemy counter-measure tactics than present day proximity fuzes.

Another still further object of the present invention is to provide a pulse doppler fuze having superior target range cut-off operational features.

Other objects and many of the attendant advantages of this invention will be readily appreciated as the same becomes better understood by reference to the following detailed description when considered in connection with the accompanying drawing wherein:

FIG. 1 is a schematic wiring diagram of the oscillator-detector circuit according to the present invention;

FIGS. 2a and 2b are graphical illustrations of certain waveform characteristics of the circuit of FIG. 1, as hereinafter to be described; and FIG. 3 is a view illustrating the use of the novel circuit of FIG. 1 in a pulse doppler proximity fuze system.

Referring now to the drawing wherein like reference characters indicate like parts throughout the several views and more particularly to FIG. 1 wherein the oscillator-detector circuit of the instant invention is indicated generally by the reference numeral 11. As shown thereon, the circuit 11 includes a pair of electron tubes 12 and 13, such for example as triodes, parallel connected across common plate and filament operating potential sources 14 and 15, respectively. The triode 12 is connected in a conventional high frequency oscillator circuit 16 which utilizes the inter-electrode capacitances of tube 12 and a portion 17 of antenna coupling coil 18 as the oscillator frequency determinative resonant network. The tank coil 17 is electrically coupled across the grid 19 and plate 21 of tube 12 by means of the grid biasing network 22 comprising resistor 23 and capacitor 24, and the high frequency by-pass capacitor 25. In like manner, tube 13 is connected in a high-frequency oscillatory circuit 26 which employs inductance coil 27, and the tube interelectrode capacitances as a frequency resonant network and the parallel combination of resistor 28 and capacitor 29 as the grid-leak or bias network 31. Coil 27 is inductively coupled to the tank coil 17 of oscillator circuit 16. The R. F. circuit from grid 32 to plate 33 is completed through the resonant and grid-leak networks by means of the high-frequency by-pass capacitor 34. For the purpose of isolating any R. F. potentials appearing on filaments 35 and 36, high frequency choke coils 37 are interposed between the filaments and the A supply 15.

By appropriate selection of the magnitudes of resistor 23 and capacitor 24, oscillator circuit 16 operates as a self pulsing, or squeeging, oscillator, the initial oscillation of which is initiated by the presence of random, or so-called "seed", noise. Upon the circuit bursting into oscillation, capacitor 24 will be charged negatively at a predetermined rate until sufficient grid bias is developed thereacross to cut-off tube 12 and terminate the oscillations. The grid bias potential will then decay exponentially at a rate proportional to the time constant of resistor 23 and capacitor 24 until it reaches a preselected reduced bias level whereupon the circuit 16 is again induced into oscillation and the hereinbefore described operation repeated. Inasmuch as the amplitude of the oscillations build up faster than the grid-bias potential, a relatively large impulse of oscillations is produced by the squeeging oscillator 16 before the grid-bias increases sufficiently to cut off tube 12. The effect of this intermittent operation of the oscillator circuit results in the development of a high frequency impulse across the tank coil 17, and a negative sawtooth output voltage waveform across grid biasing network 22 as more clearly illustrated in FIGS. 2a and 2b by waveforms 38 and 39 respectively. Although the tube and circuit capacities and inductance of coil 17 establish the carrier frequency of impulse signal 38, the impulse characteristics, such for example as the pulse shape or envelope, and the impulse repetition rate are controlled by the time constant characteristic network 22.

The circuit 26 associated with electron tube 13 is basically oscillatory like the intermittant oscillator circuit 16 and is tuned to oscillate at the same carrier frequency. However, as shown by waveform 41 of FIG. 2b the grid 32 of tube 13 is normally more heavily biased than the grid 19 of tube 21 thereby effecting a shorter duty cycle of circuit 26 than exists for circuit 16. Additionally, the discharge time constant characteristic of biasing network 31 is substantially larger than that of biasing network 22, thereby resulting in a reduced amplitude sawtooth signal appearing across network 31 with a proportionate reduction in the noise level. Interposed between the biasing network 31 and an output signal terminal 42 is a suitable carrier frequency filter consisting of resistor 43 and capacitor 44.

In response to the intermittent oscillation of circuit 16, the bias on grid 32 of tube 13 is reduced by the transformation of a positive potential signal, resulting from the decreasing bias on grid 19 through inductively coupled coils 17 and 27. Upon the grid bias potential of tube 13 reaching a preselected lower level corresponding to the peak portion 45 of impulse 38, circuit 26 is driven into oscillation. In view of the foregoing operational description of the oscillator-detector circuit 11, it will be apparent to those skilled in the art that the amplitude 46 of the output sawtooth signal 41 of circuit 26 will only be affected by a variation induced in the amplitude of pulse 38 occurring during the peak portion 45 thereof, such as will result from loading of the oscillator circuit 16 by antenna coil 18. Effectively therefore, the oscillatory circuit 26 operates as a peak detector.

Referring now to FIG. 3 of the drawing, the use of the novel oscillator-detector 11 in a transceiver system such for example as a pulse doppler ordnance fuze for which use the novel circuit is especially suited, is illustrated. As shown thereon, the squeeging oscillator 16 is coupled to a suitable electromagnetic energy radiator, or antenna 47 which will radiate into the surrounding spatial region the intermittent high frequency impulses 38 generated by the oscillator 16. The presence of a suitable target in the surrounding spatial area will result in a reflection of a portion of the radiated impulse which will be intercepted by the antenna 47. The reflected signal will effect a variation in the antenna radiation resistance, which in turn will result in a loading of oscillator circuit 16. If the reflected signal is received while the original impulse 38 is still being generated, the loading of the oscillator circuit will effect a variation in the amplitude of the pulse being developed. Any amplitude variation occurring over the peak portion 45, during which period circuit 26 is oscillating, will be transmitted as a potential variation through coils 17 and 27 to grid 32 of tube 13. It will be understood that the duration of the generated impulse 38 is preselected so that only electromagnetic energy reflected from a target within lethal range will effect the generated impulse during the peak portion 45 thereof. This amplitude variation will in turn proportionally vary the amplitude 46 of sawtooth signal 41 of peak detector 26 in a manner which results in the development of a sinusoidally varying audio frequency, often referred to as the "doppler frequency", having an envelope 48. As the distance between the proximity fuze and the reflecting target shortens, the frequency of envelope 48 will approach the predetermined band pass frequency of a conventional tuned audio amplifier 49 whereupon the amplifier will develop an output signal having an amplitude suitable for actuating a conventional thyratron firing circuit 51. Actuation of firing circuit 51 results in the ignition of an electroresponsive primer 52 whereupon the fuze will be detonated within lethal proximity of the target.

From the foregoing comprehensive description of a pulse doppler proximity fuze utilizing the novel squeeging oscillator peak detector 11 of the instant invention, a more sensitive proximity fuze has been developed inasmuch as an amplitude variation of a small magnitude is more readily detectable in a sawtooth waveform having the amplitude 46 than in a sawtooth waveform having the relatively large amplitude 53. Additionally, by reason of the relatively short duty cycle of the regenerative peak detector 26, a pulse doppler proximity fuze has been developed which will exhibit an absolute range cut-off feature. That is, the nonresponsive characteristic of the peak detector except at the peak of the transmitted impulse provides valuable protection from enemy repeater jamming as well as insensitivity to reflected signals from targets beyond the effective lethal range of the fuze.

Obviously many modifications and variations of the present invention are possible in the light of the above teachings. It is therefore to be understood that within the scope of the appended claims the invention may be practical otherwise than as specifically described.

What is claimed as new and desired to be secured by Letters Patent of the United States is:

1. An oscillator-detector circuit comprising operating potential energy sources, first self pulsing circuit means intermittently oscillatory for developing high frequency electromagnetic energy pulses of a preselected carrier frequency and repetition rate, electromagnetic energy radiating means electrically coupled to said first circuit for effecting radiation of said developed pulses into space and for receiving any reflected electromagnetic pulses, and a second oscillatory circuit means inductively coupled to said first circuit means and being rendered intermittently oscillatory during the occurrence of said developed pulses for selectively detecting variations in the magnitudes of said developed pulses caused by said reflected pulses and for developing an output signal having a frequency correlative to said variations, said first and second oscillatory circuits being parallel connected across said energy sources.

2. An oscillator-detector circuit comprising means for energizing a plurality of circuits, first self-pulsing oscillatory circuit means for generating electromagnetic energy pulses of a preselected radio frequency, first circuit means for effecting a preselected constant repetition rate of said generated pulses, electromagnetic energy actuated means inductively coupled to said first oscillatory circuit means for radiating said generated pulses into space and for receiving any reflected pulses from an object located in said space, and second oscillatory circuit means inductively coupled to said first circuit means and being rendered oscillatory only during the occurrence of said generated pulses, said second oscillatory circuit means being responsive to amplitude variations in said generated pulses effected by said reflected pulses for developing an output signal having a frequency correlative to said variations, said first and second oscillatory circuit means being commonly connected across said first named means.

3. An oscillator-detector circuit comprising a first oscillatory circuit for generating high frequency electromagnetic pulses of a predetermined amplitude, said circuit including an electron discharge device having at least filament, control grid and plate electrodes, a high frequency circuit means electrically coupled between said plate and control grid electrodes for effecting a preselected constant pulse oscillatory frequency and repetition rate, antenna means electrically coupled to said first oscillatory circuit for radiating said generated electromagnetic pulses and for receiving any reflected electromagnetic pulses, a second oscillatory circuit electrically coupled to said first oscillatory circuit and said antenna means for selectively detecting variations in the amplitude of said generated pulses resulting from said reflected pulses during the peak portion of said generated pulses, said second oscillatory circuit including a second electron discharge device having at least filament, control grid and plate electrodes, a resonant frequency circuit and a biasing circuit electrically coupled between said plate and control grid electrodes of said second electron discharge device, an electrical energy source for providing operating potentials for said oscillatory circuits, said oscillatory circuits being parallel coupled across said source.

4. An oscillator-detector circuit according to claim 3 wherein said pulse repetition rate network of said first oscillatory circuit and said biasing network of said second oscillatory circuit each includes a parallel connected resistance and capacitance having a preselected time constant characteristic.

5. An oscillator-detector circuit according to claim 4 wherein the time constant of said biasing network is substantially larger than the time constant of said pulse repetition rate network.

6. An oscillator-detector circuit according to claim 3 wherein said high frequency network of said first oscillatory circuit and said resonant frequency network of said second oscillatory circuit each includes an inductance coil and the interelectrode capacitances of the electron discharge device included in said first and second oscillatory circuits.

7. A pulse doppler proximity fuze having an oscillator-detector circuit comprising first self-pulsing oscillatory circuit means for generating a series of high frequency electromagnetic energy signals of a predetermined duration and repetition rate, electromagnetic energy radiator means electrically coupled to said first oscillatory circuit means for transmitting said generated pulses into the surrounding spatial area and for receiving impulses reflected from a target disposed in said spatial area, second self-pulsing oscillatory circuit means inductively coupled to said first self-pulsing circuit means for developing an output signal in response to a predetermined amplitude variation in said generated pulses effected by said received pulses occurring during the peak portion of said generated pulses, third circuit means for selectively developing an output triggering signal mutually correlated to the frequency of the output signal of said second self-pulsing circuit means, and fuze detonating means being responsive to said output triggering signal.

8. A pulse doppler proximity fuze having an oscillator-detector unit comprising a self-pulsing oscillator for developing a series of radio frequency electromagnetic energy impulses of a predetermined constant duration and repetition rate, each of said pulses having a peak amplitude portion, an antenna electrically coupled to said oscillator for radiating said pulses into space and for intercepting reflected pulses thereby to effect a variation in the amplitude of said developed pulses, an intermittently operating detector circuit inductively coupled to said oscillator circuit for developing an output signal having a frequency characteristic correlative to the peak amplitude variations occurring in said developed pulses during the peak amplitude portion of said developed pulses, a band pass amplifier circuit operatively coupled to said detector circuit for producing an initiating signal in response to an output signal exhibiting a preselected frequency characteristic, a normally deactivated thyratron firing circuit electrically coupled to said band pass amplifier circuit and being adapted to be activated by said initiating signal, and an electroresponsive ignition device electrically coupled to said thyratron firing circuit, said device being ignitable upon actuation of said firing circuit by said initiating signal.

9. An oscillator-detector circuit comprising an antenna, a first inductance coil connected to said antenna, a first self-pulsing oscillatory circuit for generating a series of electromagnetic energy pulses of a constant repetition rate to be radiated by said antenna into the surrounding spatial area, said circuit including a first electron tube having at least a cathode, a control grid, and an anode, a first parallel R-C network connected to said first coil and having a preselected time constant characteristic for controlling the duration and repetition rate of said generated pulses, means for coupling said first network and a preselected portion of said first coil between the control grid and anode of said first tube, a second oscillatory circuit for detecting amplitude variations in said generated pulses caused by the interception of reflected pulses by said antenna, said second circuit including a second electron tube having at least a cathode, a control grid, and an anode, a second inductance coil operatively coupled to said first inductance coil, a second parallel R-C network connected to said second coil and having a time constant characteristic for restricting the detection of amplitude variations in said generated pulses to a preselected portion thereof, means for coupling said second coil and said second network between the control grid and anode of said second tube, an output circuit connected to said second oscillatory circuit for developing an output signal having a frequency correlative to the amplitude variations detected by said second oscillatory circuit, and unidirectional potential energy means coupled across said electron tubes.

10. An oscillator-detector circuit according to claim 9 wherein said output circuit includes filtering means for removing the electromagnetic energy of said generated pulses from said output signal.

* * * * *